(12) United States Patent
McCredie

(10) Patent No.: US 6,467,246 B1
(45) Date of Patent: Oct. 22, 2002

(54) KNIFE SECTION HAVING BREAKAGE HOLES

(75) Inventor: Paul John McCredie, Milan, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/275,206

(22) Filed: Mar. 24, 1999

(51) Int. Cl.[7] .............................................. A01D 34/14
(52) U.S. Cl. ........................................ 56/296; 56/300
(58) Field of Search ...................... 56/296, 299, 300, 56/DIG. 20, DIG. 17, 289, 295, 255; 30/320, 162, 351, 274, 344, 342, 339, 337, 276

(56) References Cited

U.S. PATENT DOCUMENTS

| | | | |
|---|---|---|---|
| 6,903 A | * 11/1849 | Forbush | ........................ 56/296 |
| 305,813 A | 9/1884 | Hamblin | |
| 839,850 A | 1/1907 | Hummel | |
| 2,931,159 A | * 4/1960 | Hill | .............................. 56/299 |
| 4,134,204 A | * 1/1979 | Perdue | ........................ 30/267 |
| 4,198,803 A | * 4/1980 | Quick et al. | .................. 56/296 |
| 4,891,932 A | * 1/1990 | Johnson | ....................... 56/158 |
| 5,054,277 A | 10/1991 | Schumacher, II | |
| 5,845,474 A | * 12/1998 | Loftus | ......................... 56/291 |

* cited by examiner

Primary Examiner—Thomas B. Will
Assistant Examiner—Meredith C Petravick

(57) ABSTRACT

A double knife section for a reciprocating sickle bar mower is provided with two knives. Each knife is provided with a base portion extending in the transverse direction and a knife portion extending in the longitudinal direction. The base portion is provided with at least two mounting holes. The knife portion is provided with two cutting edges. The knife is also provided with a series of breakage holes defining transverse breakage zones which allow a knife to break before damaging the knife guard holding the knife. The holes are sized to allow for breakage of the knife before breaking the guard.

14 Claims, 1 Drawing Sheet

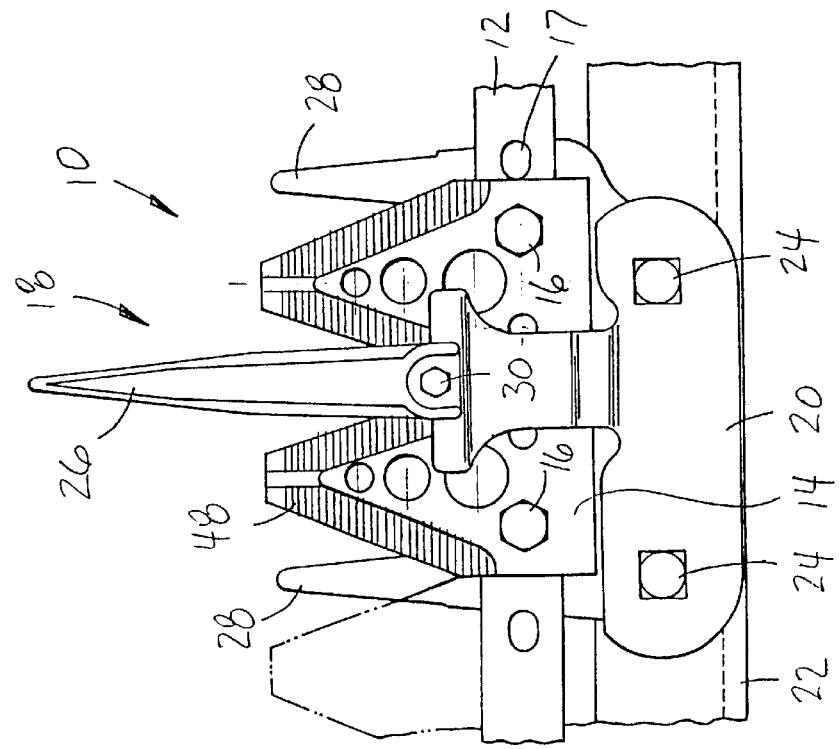
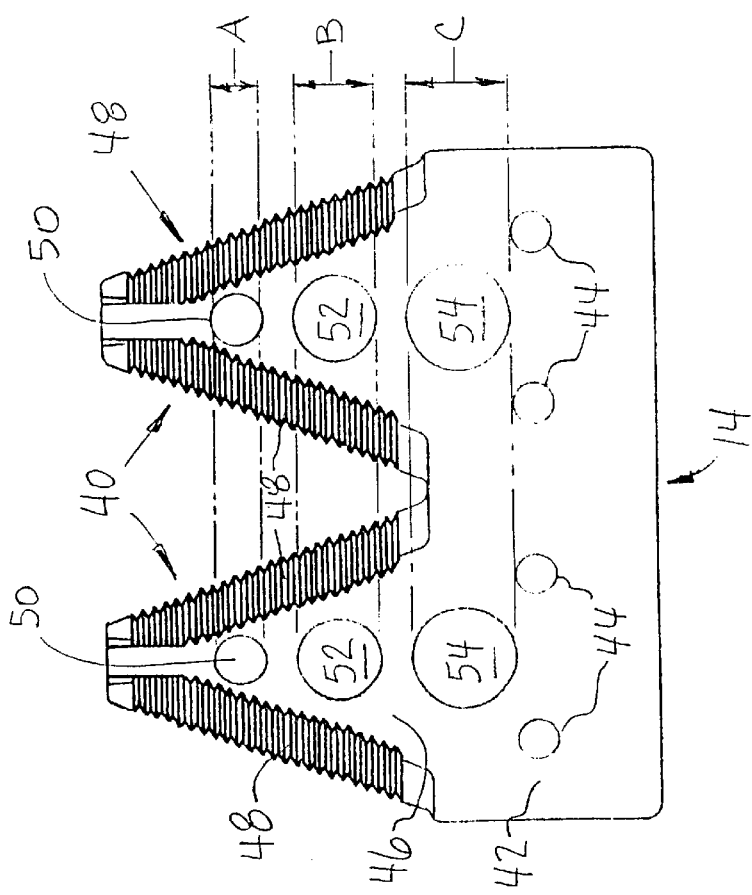

KNIFE SECTION HAVING BREAKAGE HOLES

BACKGROUND OF THE INVENTION

1. Field of the Invention

The invention is directed to a knife having a series of longitudinally arranged circular breakage holes defining transverse breakage zones.

2. Description of the Prior Art

Reciprocating sickle bar mowers are used to cut vegetation and crops. A plurality of knives are mounted to the sickle bar by mounting bolts or rivets. The sickle bar reciprocates in a channel defined by sickle bar guards. The guards have slots in which the knives reciprocate. The edges of the slots are provided with ledger plates that cooperate with the reciprocating knives to cut the crop and vegetation by a scissors-like action. Each knife is provided with a base portion extending in the transverse direction and knife portion extending longitudinally out from the base portion. The base portion is provided with mounting holes for receiving the mounting rivets or bolts. The knife portion in turn is triangular in shape and is provided with two cutting edges. Adjacent knives maybe integrally joined together to form double knife sections. Some knives have holes to better clean out debris from between the knife and the knife guard.

SUMMARY OF THE INVENTION

It is an object of the present invention to provide a knife for a reciprocating sickle bar mower having defined transverse breakage zones wherein a knife breaks along one of these transverse breakage zones when a stone or other foreign object is trapped between the reciprocating knife and the guard.

It is another object of the present invention to provide a knife that can still function even though it is broken at one of the transverse breakage zones.

It is a feature of the present invention that the knives are through hardened which prevents them from bending when contacting stones and other foreign objects.

A double knife section for a reciprocating sickle bar mower is provided with two knives. Each knife is provided with a base portion extending in the transverse direction and a knife portion extending in the longitudinal direction. The base portion is provided with at least two mounting holes. The knife portion is provided with two cutting edges. The knife is also provided with a series of breakage holes defining transverse breakage zones which allow a knife to break before damaging the knife guard when the knife contacts a stone or other foreign object.

BRIEF DESCRIPTION OF THE DRAWINGS

FIG. 1 is a top view of a portion of the sickle bar mower.

FIG. 2 is a top view of a double knife section having two knives.

DETAILED DESCRIPTION

FIG. 1 discloses a portion of a sickle bar mower 10 having a sickle bar 12 which is provided with a series of oval holes 17. Double knife section 14 is mounted to the sickle bar by mounting bolts 16. Each mounting bolt is provided with an oval throat portion that fits into oval holes 17. The sickle bar and knives reciprocate in guards 18 having hold clips 20. The hold down clips 20 are bolted to support 22 together with a series of guards 18, only one shown, by bolts 24. The illustrated guard 18 is provided with a central long finger 26 and two outside short fingers 28. Guards located adjacent to the illustrated guards would have two outside long fingers and a central short finger. Hold down bolt 30 is used to drive the tip of the hold down clip towards the knife section 14.

Each double knife section 14 is through hardened to promote breakage before bending of the knife. Stones and other foreign objects becoming trapped between the knife and the guard break the knife along a transverse breakage zone before damaging the guard.

Each knife section 14 has two integral and identical knives 40. In turn each knife 40 has a base portion 42 having a generally transverse axis. The base portion is provided with two mounting holes 44. A knife portion 46 extends longitudinally from the base portion 42. Each knife portion 46 is provided with two cutting edges 48. In the illustrated embodiment the cutting edges 48 are serrated. It should be noted that each base portion is provided with two mounting holes 44 so that each double knife section is provided with four mounting holes. Typically, as illustrated in FIG. 1, only two mounting bolts 16 are used to secure the double knife section 14 to the sickle bar 12. However at splice joints all four mounting holes 44 of the double knife section 14 may contain mounting bolts 16.

Each knife 40 is provided with three circular breakage holes 50, 52 and 54 that are arranged along the longitudinal centerline of the knife 40. These breakage holes 50, 52 and 54 define transverse breakage zones A, B and C, respectively. These breakage holes get progressively larger as they go from the knife portion 46 to the base portion 42. Two of the breakage holes 50 and 52 are located in the knife portion 46 of the knife 40. If for example, a stone is trapped between the long guard finger 26 and the top portion of one of the knives 40, the reciprocating action of the sickle bar would break the tip of the knife off through transverse breakage zone A defined by breakage hole 50. However those portions of the cutting edges 48 located below the break would continue to cut, albeit at a less efficient rate. If stones or other foreign objects are trapped lower down the knife the breakage may occur at transverse breakage zone B. Still a small portion of the cutting edges located below the break would continue to function.

The base portion 42 is provided with a third breakage hole 54 which defines breakage zone C. A portion of breakage hole 54 extends into the knife portion 46. In the most severe applications the knife will break at breakage hole 54 through transverse breakage zone C. Such a break would eliminate the cutting edges 48 of broken knife from service, but the other knife of the double knife section 14 would still cut.

As shown in the drawings the breakage holes have different sizes. These breakage holes are sized so that the breakage occurs before breaking the guard at different contact locations between the guard and the knife.

The invention should not be limited by the above described embodiments, but should be limited solely by the claims that follow.

What is claimed is:

1. A knife for a reciprocating sickle bar mower, the knife comprising
   a base portion having a generally transverse axis and having mounting holes for securing the knife to a sickle bar;
   extending longitudinally from the base portion is a knife portion having at least one cutting edge, the knife portion having at least two breakage holes each hole defining a transverse breakage zone wherein the knife portion breaks at one of these transverse breakage zones before breaking a sickle guard in which the knife reciprocates, the knife being through hardened.

2. A knife as defined by claim 1 wherein the knife is provided with two cutting edges.

3. A knife as defined by claim 2 wherein the base portion is provided with one breakage hole defining a transverse breakage zone.

4. A knife as defined by claim 3 wherein the knife is integral with a second knife forming a double knife section.

5. A knife for a reciprocating sickle bar mower, the knife comprising a base portion having a generally transverse axis and having mounting holes for securing the knife to a sickle bar, the base portion having a separate breakage hole defining a transverse breakage zone wherein the base portion breaks at the transverse breakage zone before breaking a sickle guard in which the knife reciprocates;

extending longitudinally from the base portion is a knife portion having at least one cutting edge, the knife portion having a breakage hole, the breakage hole of the knife portion defining a transverse breakage zone wherein the knife portion breaks at the transverse breakage zone before breaking a sickle guard in which the knife reciprocates.

6. A knife as defined by claim 5 wherein the knife is through hardened.

7. A knife as defined by claim 6 wherein the knife is provided with two cutting edges.

8. A knife as defined by claim 7 wherein the base portion of the knife is integral with a base portion of a second knife forming a double knife section.

9. A double knife section for a reciprocating sickle bar mower, the double knife section comprising:

two knives each having a base portion that are integral with one another, the base portions having a generally transverse axis, the base portion are provided with at least two mounting holes;

each knife is provided with a triangular knife portion extending longitudinally from the respective base portion, each knife portion is provided with two cutting edges, each knife is also provided with three circular breakage holes defining independent transverse breakage zones.

10. A double knife section as defined by claim 9 wherein the double knife section is through hardened.

11. A double knife section as defined by claim 10 wherein the breakage holes are arranged longitudinally on each knife.

12. A double knife section as defined by claim 11 wherein in each knife two of the breakage holes are located in the knife portion and the third breakage hole is located in the base portion.

13. A double knife section as defined by claim 12 wherein the breakage holes increase in size from the knife portion to the base portion.

14. A double knife section as defined by claim 13 wherein each base portion is provided with two mounting holes.

* * * * *